(12) United States Patent
Forsythe, Jr. et al.

(10) Patent No.: US 11,841,837 B2
(45) Date of Patent: Dec. 12, 2023

(54) COMPUTER-BASED SYSTEMS AND METHODS FOR RISK DETECTION, VISUALIZATION, AND RESOLUTION USING MODULAR CHAINABLE ALGORITHMS

(71) Applicant: Qlarant, Inc., Easton, MD (US)

(72) Inventors: Ronald G. Forsythe, Jr., Fruitland, MD (US); William Mapp, III, Upper Marlboro, MD (US)

(73) Assignee: Qlarant, Inc., Easton, MD (US)

( * ) Notice: Subject to any disclaimer, the term of this patent is extended or adjusted under 35 U.S.C. 154(b) by 0 days.

(21) Appl. No.: 16/900,224

(22) Filed: Jun. 12, 2020

(65) Prior Publication Data
US 2021/0390084 A1    Dec. 16, 2021

(51) Int. Cl.
| | |
|---|---|
| G06F 16/21 | (2019.01) |
| G06F 16/22 | (2019.01) |
| G06F 16/26 | (2019.01) |
| G06F 9/30 | (2018.01) |

(52) U.S. Cl.
CPC .......... *G06F 16/212* (2019.01); *G06F 9/3005* (2013.01); *G06F 16/2219* (2019.01); *G06F 16/26* (2019.01)

(58) Field of Classification Search
CPC ..... G06F 16/212; G06F 16/26; G06F 16/2219
USPC .......................................................... 707/803
See application file for complete search history.

(56) References Cited

U.S. PATENT DOCUMENTS

| | | | |
|---|---|---|---|
| 2015/0235154 A1* | 8/2015 | Utschig .............. | G06Q 10/0637 705/7.36 |
| 2017/0124263 A1* | 5/2017 | Crafts, Jr. .............. | G16H 70/20 |
| 2021/0005307 A1* | 1/2021 | Knoplioch ............. | G16H 30/20 |
| 2021/0374032 A1* | 12/2021 | Rakshit ............... | G06F 11/3457 |

OTHER PUBLICATIONS

Verschueren et al. Towards a Modular Software package for Embedded Optimization. 7 pages (Year: 2018).*

* cited by examiner

*Primary Examiner* — Kimberly L Wilson
(74) *Attorney, Agent, or Firm* — McCarter & English, LLP (57) ABSTRACT

Computer-based systems and methods for risk/reward detection, visualization, and resolution using modular chainable algorithms are provided. The system allows for computer-based modeling of large data sets with improving processing speed and utilizing fewer computational resources. The modular chainable algorithms included embedded program code executable by a processor for performing a data modeling or analytic function on source data, visualization code for visualizing output of the program code, and workflow code for automatically performing one or more actions relating to the data modeling or analytic function.

23 Claims, 12 Drawing Sheets

COMPUTER-BASED SYSTEMS AND METHODS FOR RISK DETECTION, VISUALIZATION, AND RESOLUTION USING MODULAR CHAINABLE ALGORITHMS

BACKGROUND

Technical Field

The present disclosure relates generally to the field of information technology. More specifically, the present disclosure relates to computer-based systems and methods for risk detection, visualization, and resolution using modular chainable algorithms.

Related Art

Various computer-based data analytics tools have, in the past, been developed for use in various fields of endeavor. One such field relates to the detection of billing patterns and fraud detection for various entities, such as government entities. While such tools have the capability of detecting risk patterns and visualizing such patterns, they are often limited in their algorithmic flexibility, thereby limiting the value of such tools. Moreover, such systems lack the ability to chain multiple algorithms together, in a modular fashion, to conduct sophisticated modeling and analytics tasks. Accordingly, these and other needs are addressed by the systems and methods of the present disclosure.

SUMMARY

The present disclosure relates to computer-based systems and methods for risk detection, visualization, and resolution using modular chainable algorithms. The system allows for computer-based modeling of large data sets with improving processing speed and utilizing fewer computational resources. The modular chainable algorithms included embedded program code executable by a processor for performing a data modeling or analytic function on source data, visualization code for visualizing output of the program code, and workflow code for automatically performing one or more actions relating to the data modeling or analytic function.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to computer-based systems and methods for risk detection, visualization, and resolution using modular chainable algorithms, as described in detail below in connection with FIGS. 1-12.

Figure 1:
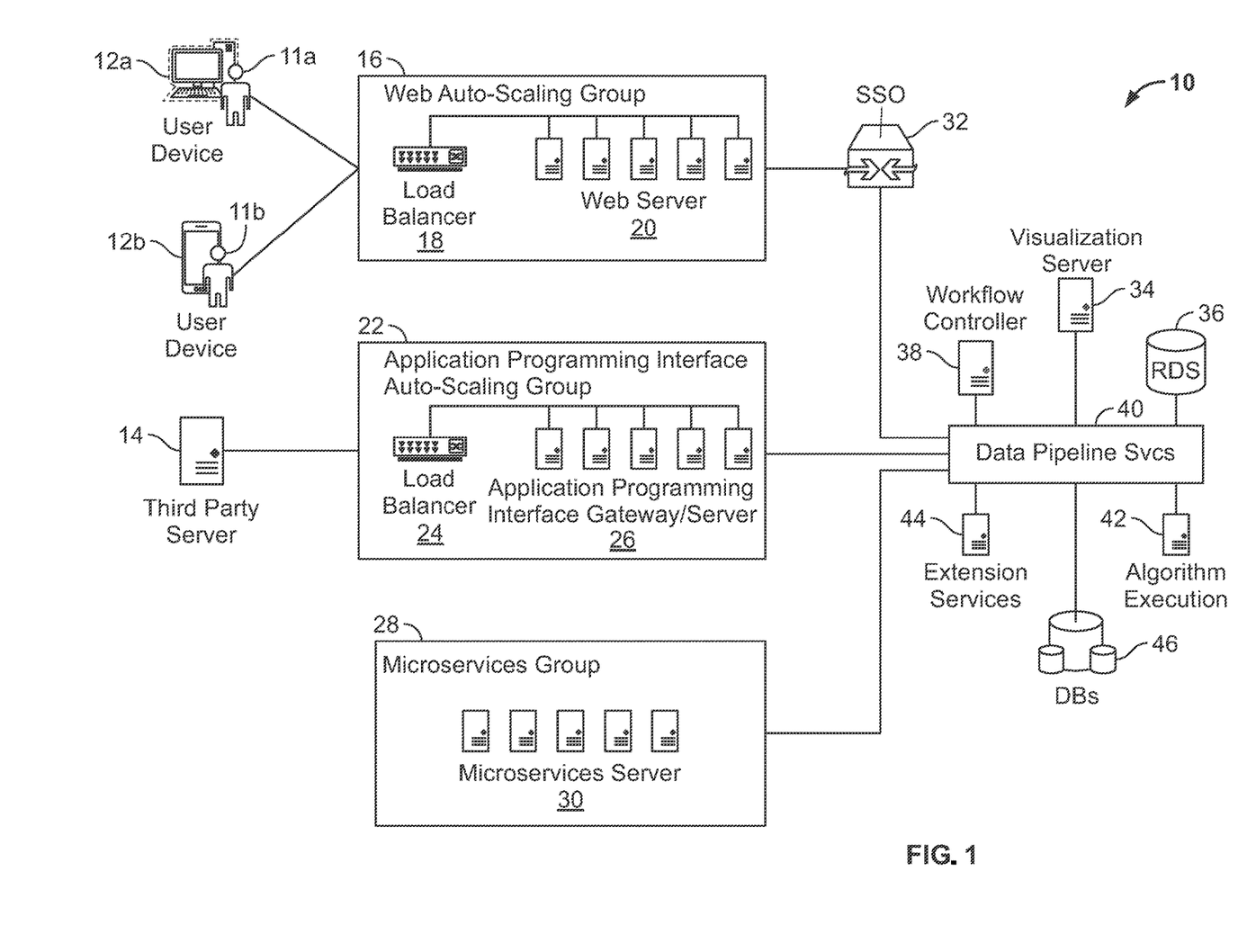
FIG. 1 is a diagram illustrating the system of the present disclosure.

FIG. 1 is a diagram illustrating the system 10 of the present disclosure. The system provides computer-based risk detection, visualization, and resolution from large data sets, using modular chainable algorithms. The system 10 provides these features by performing advanced data analysis on input data and displaying analysis results to one or more users that have the ability to create cases for further review or investigation. As will be discussed in further detail below, the system 10 utilizes web applications, microservices servers, database systems, and external applications to provide the risk detection, visualization, and resolution features to the one or more users.

As shown in FIG. 1, the system 10 includes user devices 12a, 12b, a third party server 14, a web auto-scaling group 16, an application programming interface (API) auto-scaling group 22, a microservices group 28, a single sign-on 32 (SSO) and a data pipeline services system 40. The user devices 12a, 12b are in communication with the web auto-scaling group 16 which includes a load balancer 18 and one or more web servers 20. The third party server 14 is in communication with the API auto-scaling group 22 which includes a load balancer 24 and one or more API gateways or servers 26. The microservices group 28 includes one or more microservices servers 30.

The data pipeline services system 40 is in communication with a visualization server 34, a relational data service (RDS) database 36, a workflow controller 38, an algorithm execution system 42, an extension services server 44, and a plurality of databases 46. It is noted that the components of the system 10 can be implemented using one or more software or hardware components, such as page design software applications, workflow controller and data platform applications, relational and/or non-relational database server applications, web application runtime components, key-value storage systems, and various modules for providing data analytics and visualization. Of course, a person of ordinary skill in the art appreciates that various other software applications can be utilized to implement the various features of the system of the present disclosure, and that the systems and methods of the present disclosure are not limited in this regard.

The system 10 is designed for scalable computing and serves small commodity web servers for delivering front-end experience to the users 11a, 11b backed by slightly larger (and scalable) application servers and database clusters. The system 10 can run in any hosted environment. For example, the system 10 can be hosted on a cloud provider, including, but not limited to, Amazon® Web Services (AWS), Google® Cloud Platform, Microsoft® Azure, etc.

The system 10 utilizes one or more algorithms to process input data to generate cases for investigators or individuals in the field. These algorithms can be triggered to execute in the backend architecture of the system 10 but can also be executed by the API auto-scaling group 22 and the microservices group 28. It is noted that the web-auto-scaling group 16 can run asynchronously and can execute an algorithm such that the system 10 is responsive to the users 11a, 11b.

As will be described in greater detail below, the system 10 executes one or more "chainable" algorithms to manipulate and generate user inputs and data lists. The algorithm can consist of one or more input data sources, algorithmic processing and the presentation of and execution upon resultant data. Specifically, the algorithms can receive input data sources, process the received input data sources, and display results in one or more formats such that the results can be acted upon in a course of action. Importantly, the chainable algorithms of the present disclosure are software components which include algorithms for conducting one or more modeling or data analytics functions, as well as software instructions for automatically rendering/displaying the results of such modeling or data analytics on one or more computer systems. The chainable algorithms "containerize" the algorithms for performing modeling/analytics, as well as computer-executable instructions for controlling how the results of modeling/analytics are displayed, the data used to resolve itself, and what additional information should be collected to support additional analysis by a subject matter expert or a subsequent algorithm. Each chainable algorithm generates a list of items or subsequent actions to be taken, including resolution or collection of follow-up information, as well as generation of visualizations that generate progress toward resolution of an issue. The features of the algorithms of the system 10 will be discussed in further detail below.

Input data sources vary and as such the algorithm of the system 10 can process multiple types of input data sources. For example, a library of Python algorithms can be designed and implemented to handle data in structured forms in SQL databases, network accessible data sources including those using an Internet Uniform Resource Locator (URL) or web service, as well as file and list formats. In addition to file and relational formats, the algorithms of the system 10 can support JavaScript Object Notation (JSON) and Extensible Markup Language (XML) formats through the utilization of NoSQL data connections and XML import files.

The algorithms executed by the system 10 can generate resultant data to be stored in one or more data sources. The architecture of the system 10 provides access to multiple databases. For example, relational data can be stored in the RDS database 36 (e.g., a PostreSQL database) and JSON data can be stored in the plurality of databases 46 (e.g., a Sharded Mongo database cluster for hosting NoSQL collections). Additionally, data sources may consist of one or more non-data items including, but not limited to, a Portable Document Format (PDF) or a Word document, a spreadsheet, an image, and other binary items. A non-data item can be provided to the algorithm through a path variable and can be stored internally by the system 10 or externally (e.g., Amazon S3). Whether a non-data item is stored internally by the system 10 or externally can be determined when authoring the algorithm.

In some cases, the system 10 may receive, as an input data source, data from another system (e.g., an application). As such, the data may be stored in a proprietary format and require one or more data transformation steps before the data can be processed by an algorithm of the system 10. A data transformation step can be executed independently of an execution boundary of an algorithm of the system 10. It is noted that an algorithm of the system 10 can provide an optional means for validating the data before any processing occurs.

In addition to an input data source, an algorithm of the system 10 may be provided with one or more input parameters to govern the algorithmic processing of the algorithm. It is noted that a system administrator or analyst can adjust the one or more input parameters when authoring the algorithms. Each parameter can be accompanied by a user viewable prompt, its data type, and bounded values that can be provided to the algorithmic processing for input validation. Each algorithm of the system 10 may execute processing against statically defined data (i.e., static data) or data that can change over time (i.e., dynamic data). The system administrator or analyst can tag the input data as static or dynamic when authoring the algorithm.

The system 10 supports Python as the standard language for algorithmic processing. An analyst can edit a Python script file by utilizing one or more development tools and thereafter upload the edited Python script file into the system 10. The system 10 can execute the edited Python script file by utilizing a standard calling infrastructure providing the algorithm with its input data source path which may consist of a connection string, path to a file, or a web address. A data source parameter provided to a Python script file can follow the Uniform Resource Indicator (URI) syntax, consisting of a scheme and a location. It is noted that the foregoing functionality could be coded using programming languages other than the Python programming language.

The algorithmic processing generates one or more lists of resultant data that can be acted upon in a Course of Action (CoA). Each item of a generated list is its own contained resultant. As such, a CoA can be executed against a list or a resultant item of the list. A system analyst can determine whether to execute the CoA against the list or the resultant item of the list when authoring the algorithm. Optionally, as part of its output, an algorithm can generate a confidence score for each generated list of resultant data. The confidence score can be utilized to evaluate a degree of trust by the algorithmic processing in each generated list of resultant data. The confidence score can be available as a data member in the object and can be assigned a value between 0 and 1, NOT_APPLICABLE or UNDEFINED. A confidence score may be defaulted to NOT_APPLICABLE. A system analyst can optionally program for the default NOT_APPLICABLE capability so that calling software can determine if the value should be utilized in further processing.

Visualization is implemented by interactive data visualization software (e.g., Tableau or other suitable visualization software) and presented in the system 10 web application in a Hyper Text Markup Language (HTML) Inline Frame (IFRAME) construct. For example, an analyst in Tableau can utilize resultant data generated from the execution of algorithmic processing to define an algorithm presentation. An algorithm of the system 10 can provide Tableau its resultant data as an input parameter that is a pointer to data, or store its resultant data in one or more database collections (e.g., NoSQL) or database tables (e.g., a relational database management system (RDBMS)) that Tableau can access and read. The aforementioned algorithm presentation can be rendered by providing a Tableau generated Uniform Resource Locator (URL) to an application of the system 10. A URL can be defined when the algorithm is authored and can be stored as part of an object storage of the algorithm.

As discussed above, a CoA can be authored by an analyst and consists of a workflow map drawn using business process model and notation (BPMN) or presented in any suitable notation that is capable of tracking progress or a series of linear or non-linear steps. Each step of the workflow map is indicative of an activity or work item that can be executed during the CoA. The system 10 can utilize a platform (e.g., Camunda, or other suitable case management tools/systems) for storing and executing the CoA. For example, a Camunda workflow map utilizes a work item that proceeds through each activity or workflow step. Each work item can be assigned a unique identification (ID) generated by Camunda and stored within an application database of the system 10. Work items proceed through a Camunda workflow by setting one or more status codes for a specific workflow step that can instruct Camunda to transmit the work item to the next workflow step or fail the current workflow step. It is noted that an analyst can determine the workflow step, the return code of the workflow step and the next workflow step when authoring the algorithm. In addition, a workflow step can be passive or active. An active workflow step can require that another algorithm be executed to determine the return code thereof and may not be determined by a user generated activity or selection. It is also noted that CoA progression and work item status are maintained within the Camunda tool but can be accessible to a user of the system 10.

Figure 2:
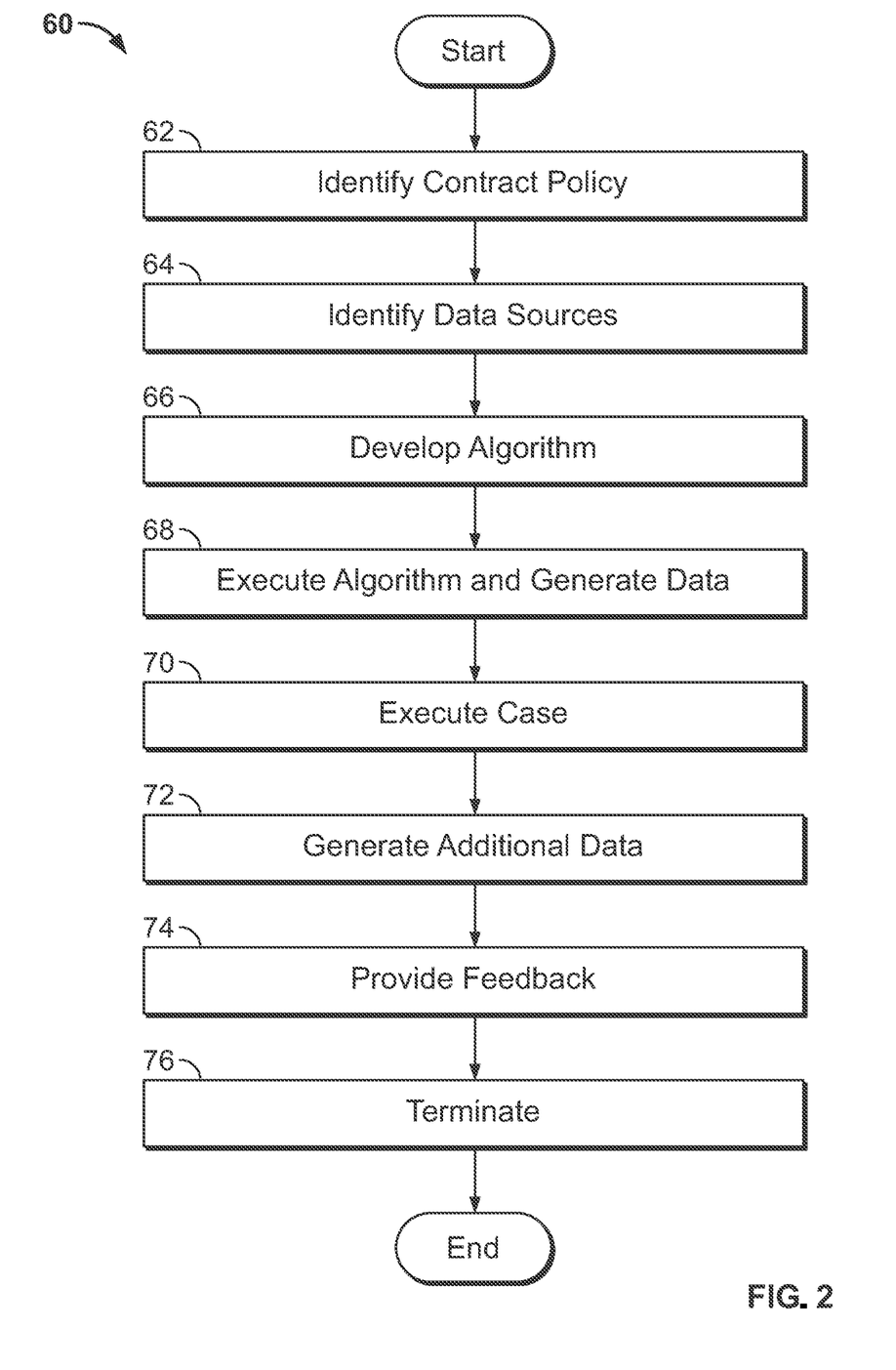
FIG. 2 is a flow chart illustrating processing steps carried out by the system of the present disclosure for developing and executing an algorithm.

FIG. 2 is a flow chart illustrating processing steps 60 carried out by the system 10 of the present disclosure for developing and executing an algorithm. An algorithm development contract can span multiple subject areas and, as such, in step 62, an analyst or other personnel can communicate with stakeholders to identify and develop contract policy. In step 64, one more data sources including, but not limited to, physical and digital sources, relevant to the contact policy are identified. Then, in step 66, the analyst/personnel develop one or more modular, chainable algorithms and data models in accordance with the present disclosure based on the identified contract policy, data sources, and subject matter expertise.

In step 68, the personnel execute the one or more modular, chainable algorithms in accordance with the present disclosure to generate data including analytics and one or more lists of resultant data. In step 70, a field investigator and/or operator can execute one or more cases generated from the one or more lists of resultant data. In steps 72 and 74, additional one or more lists of resultant data and feedback are generated from the data collected by the field investigator and/or operator during the execution of the one or more cases. Lastly, in step 76, the additional one or more lists of resultant data and feedback are utilized to determine whether a case can be terminated.

Figure 3:
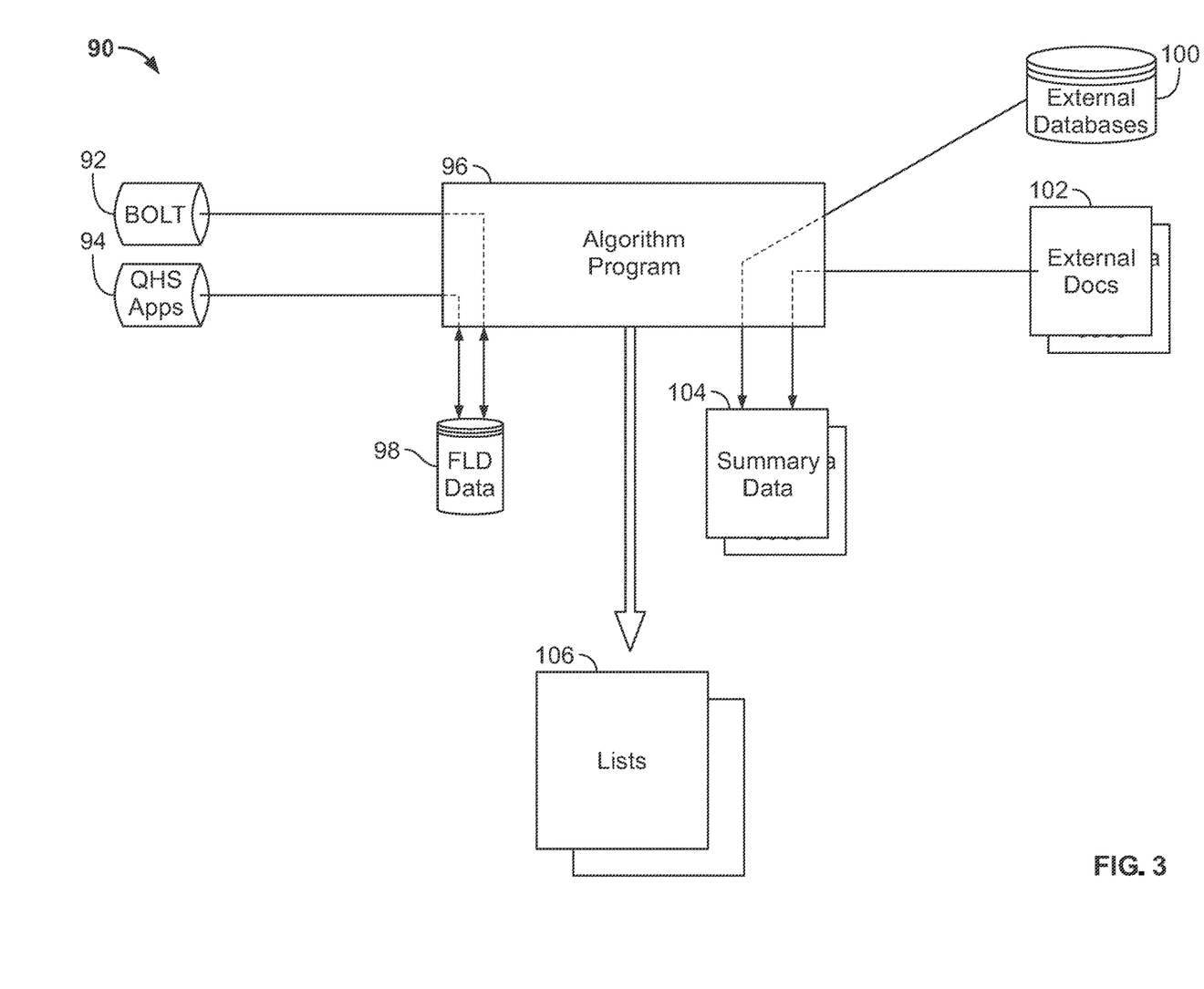
FIG. 3 is a diagram illustrating an overview of an algorithm executed by the system 10 of the present disclosure.

FIG. 3 is a diagram 90 illustrating an overview of an algorithm 96 executed by the system 10 of the present disclosure. The algorithm 96 of the system 10 utilizes a pointer to the resource(s) it requires for processing to minimize memory requirements during execution time. As discussed above, the algorithm 96 utilizes a plurality of input data sources and databases for execution that can be persistent storage or path storage. For example, the algorithm 96 can utilize data stored and/or sourced from a Bolt database 92, one or more applications 94, FLD data 98, one or more external databases 100 and one or more external documents 102. It is noted that summary data 104 can be generated based on the data stored and/or sourced from the one or more external databases 100 and the one or more external documents 102. The system 10 utilizes string values to access the input data sources and databases. As discussed above, execution of the algorithm 96 generates one or more lists 106 of resultant data.

Figure 4:
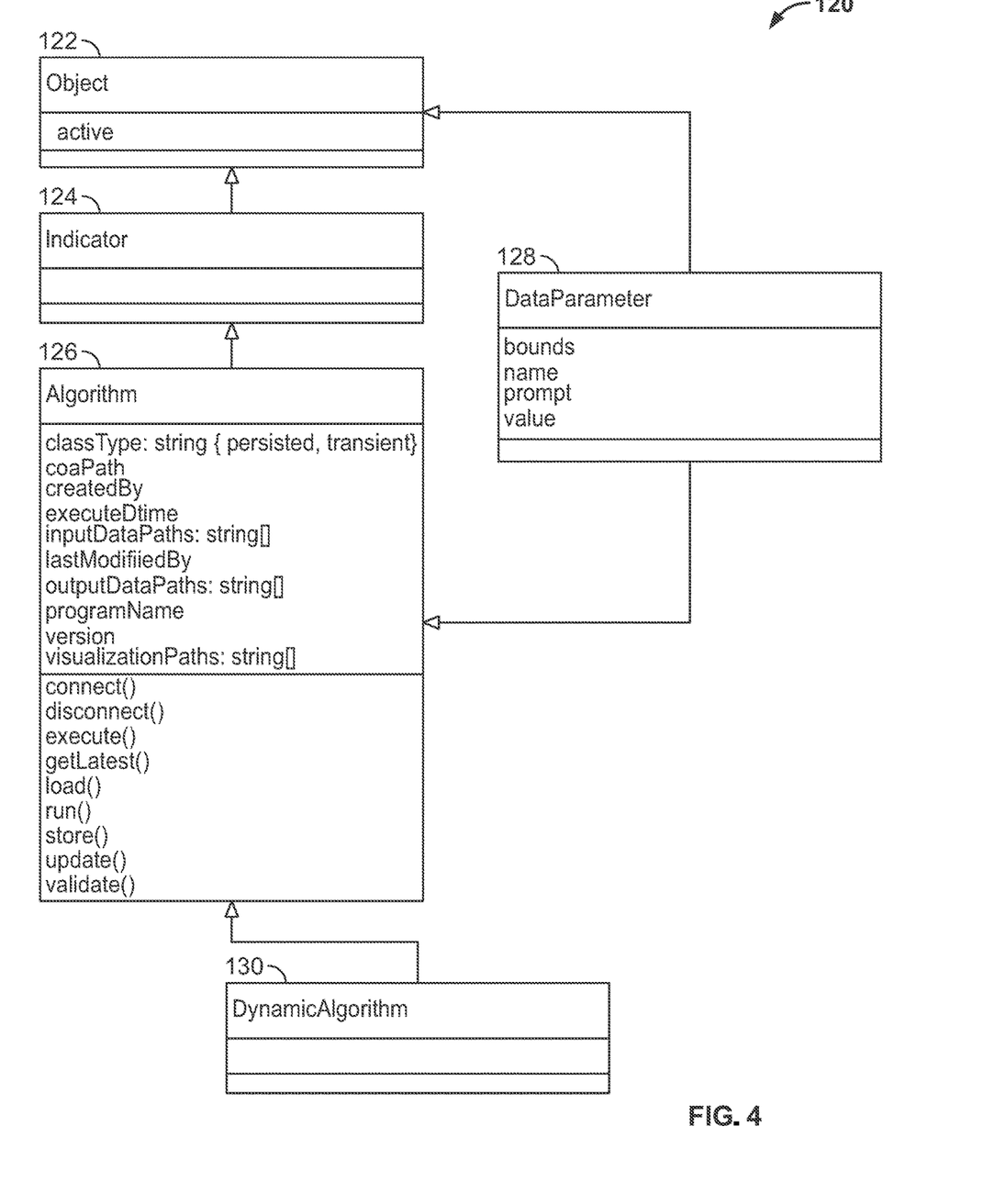
FIG. 4 is a diagram illustrating a class design of the algorithm of FIG. 3.

FIG. 4 is a diagram 120 illustrating a class design of the algorithm 96 of FIG. 3. The algorithm 96 can include one or more data members and methods that can be utilized to connect to and load data from external sources, execute the algorithmic program thereof, and store resultant data in one or more data sources. As shown in FIG. 4, the class design can include, but is not limited to an object 122, an indicator 124, an algorithm 126, a data parameter 128, and a dynamic algorithm 130. Each of the object 122, the indicator 124, the algorithm 126, the data parameter 128, and the dynamic algorithm 130 can include one or more operators. For example, the data parameter 128 can include operators such as, but not limited to, a bound, a name, a prompt and a value.

The algorithm 96 can be authored in a plurality of programming languages. For example, the algorithm 96 can be authored in programing languages including, but not limited to, C#, JAVA, Python and R. These languages can support advanced math concepts including high-level abstraction of arrays and matrices, can be loaded directly from a disk and into memory, can be reduced to instructions and executed in RAM, and can allow access to shared memory resources through an operating system of the system 10. In addition, C#, JAVA, Python and R can be compiled, interpreted or transpiled.

It is noted that a plurality of algorithms 96 can be chained or linked together to execute a complex series of tasks on data. The algorithms 96 are chained via a next data member in the algorithm class. Additionally, one or more input parameters can be optionally passed to chained algorithms 96 through an Algorithm Information Protocol (AIP). The AIP contains information including, but not limited to, a location of an algorithm 96 by utilizing a URL, a name of the algorithm 96, a list of one or more named input parameters provided in order, and a list of one or more named return values provided in order. Algorithm execution could be performed in order, such that execution of each algorithm 96 in a chain is performed synchronously (i.e., each algorithm 96 runs to completion and returns its values once completed). However, such "serial" execution of the algorithms 96 need not be required, and indeed, the algorithms 96 could execute in "parallel" if desired. Still further, a user can begin working with the results of one algorithm while another algorithm is being executed.

AIP is a JSON based descriptive language utilized to communicate an algorithm 96 and its metadata to one or more calling programs or to other algorithms 96. Table 1 illustrates example AIP message members.

TABLE 1

| Field Name | Type | Description | Required | Example |
| --- | --- | --- | --- | --- |
| location | String | Path to the algorithm. | Yes | http://server/path/to/file |
| parameters | Array | Array of named typed parameters | Yes | {name: "x", type: "int"}, {name: "y", type: "int"} |
| returns | Array | Array of named, typed values | Yes | name: "sum", type: "number", value: "6"}, {name: "product", type: "number", value: "9"} |

An algorithm 96 can be passed by a number of algorithm dependent values. It is noted that a user may add a list of name/value pairs to the JSON object used to describe the algorithm 96 since the base format for AIP is JSON.

Figure 5:
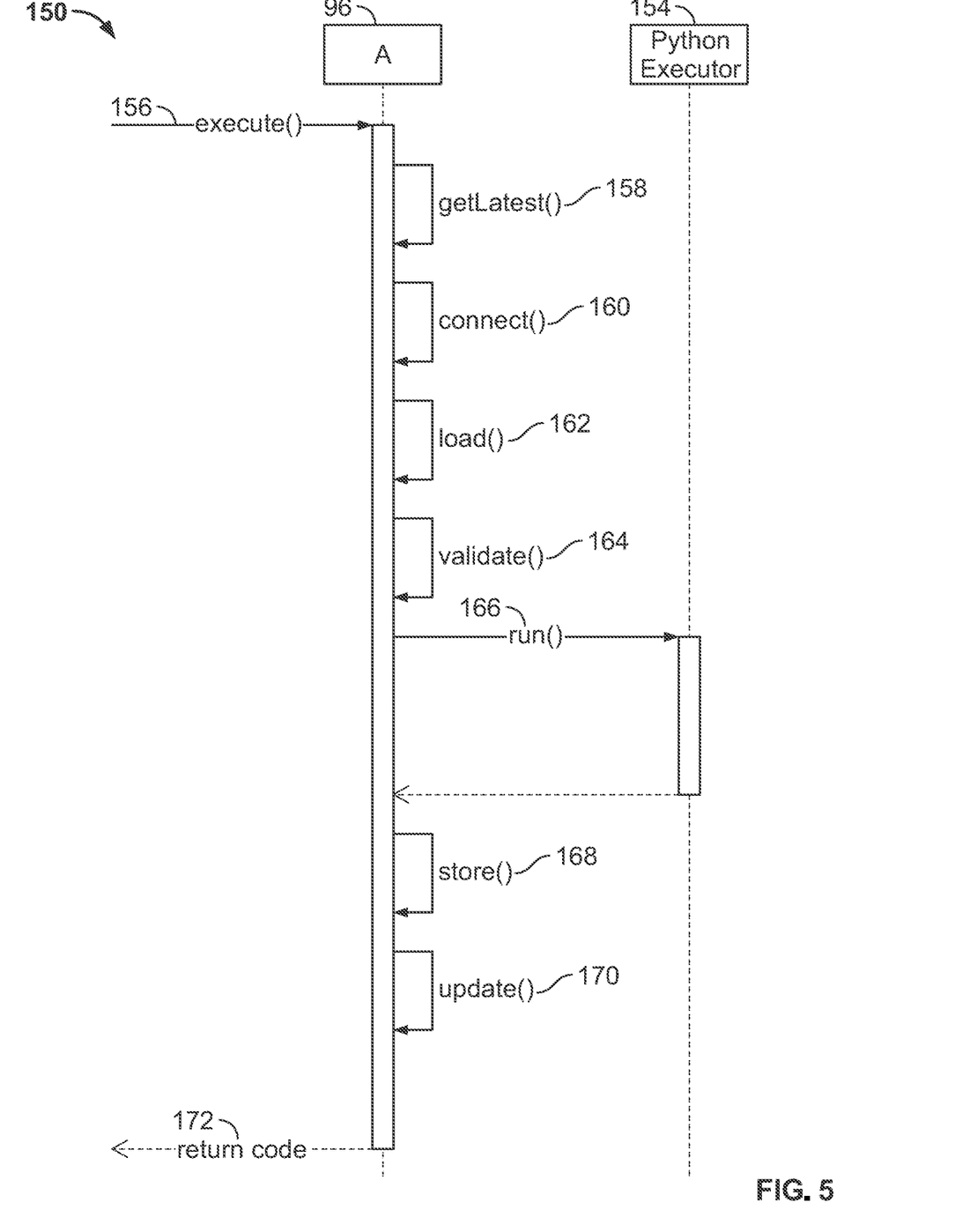
FIG. 5 is a diagram illustrating an execution sequence of the algorithm of FIG. 3.

FIG. 5 is a diagram 150 illustrating an execution sequence of the algorithm 96 of FIG. 3. The algorithm 96 can receive an execution command 156 from the system 10. Thereafter, the algorithm 96 executes a plurality of pre-processing commands 158-164 before transmitting a run command 166 to an executor 154 (e.g., a Python Executor). The executor 154 runs the algorithm 96 to generate one or more lists of resultant data. Subsequently, the algorithm 96 stores the generated one or more lists of resultant data via command 168 and executes an update command 170 before transmitting a return code command 172 to the system 10.

Figure 6:
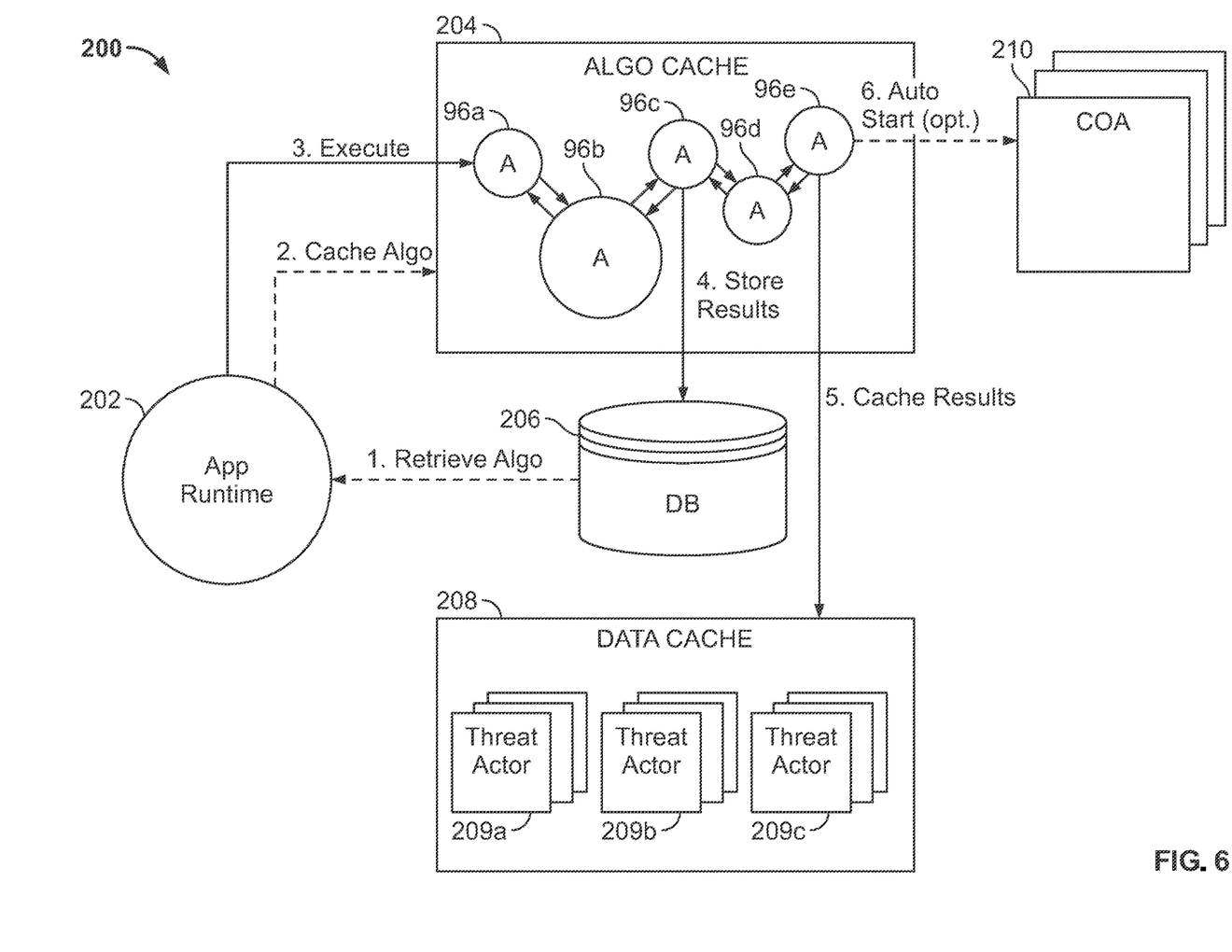
FIG. 6 is a diagram illustrating execution of an algorithm of FIG. 3 by the system of the present disclosure.

FIG. 6 is a diagram 200 illustrating execution of an algorithm by the system 10 of the present disclosure. One or more algorithms can be executed by one or more nodes hosting an application server 202 of the system 10. The application server 202 executes an algorithm via steps 1-6 as shown in FIG. 6. In step 1, an algorithm is retrieved from a relational database 206. If the algorithm is present in a cache of the application server 202, then the algorithm is loaded from the RAM rather than the relational database 206. The application cache checks for a dirty flag or scratch to determine if the algorithm has been changed. If the algorithm has been changed, then the cached value is updated. In step 2, the algorithm is stored in the algorithm cache 204 using its location as the key value. As such, other callers can quickly retrieve the algorithm for execution. It is noted that a plurality of algorithms 96a-96e can be stored in the algorithm cache 204. Then, in step 3, the algorithm is executed by utilizing its language appropriate runtime (e.g., Python or R). In step 4, the algorithm stores generated resultant data from the execution of the algorithm in the relational database 206. In step 5, the algorithm caches the resultant data 209a-209c in the data cache 208. As such, the resultant data can be quickly retrieved by other calling programs and users instead of reading from the relational database 206. Optionally, in step 6, a new CoA 210 can be executed based on the generated resultant data.

It is noted that an object of the algorithm 96 can be written to and read from storage because the object is inherited from an indicator class which in turn is inherited from a streamable object class. As such, an object of the algorithm 96 can be loaded from different interfaces and executed in an application of the system 10. Additionally, because the class can be persisted, the algorithm 96 can be stored in a library, modified and tracked by an analyst, and versioned. The algorithm class can contain one or more data members for storing user information, creation and update dates and times, and status information indicative of whether algorithm execution is in progress, completed or not started. It is also noted that program code of the algorithm 96 can be stored or reside in a plurality of locations because the algorithm 96 can be written to a stream and, as such, the program code can be stored on a disk, on a server, or in a database table. The algorithm program code is loaded through a URL such that a scheme of the URL determines a location of the source code. The system 10 can utilize Hypertext Transfer Protocol (HTTP), Hypertext Transfer Protocol Secure (HTTPS), file and database schemas, but of course, other protocols and schemas can be utilized without departing from the spirit or scope of the present disclosure.

A web-based application can be implemented by the system 10 and runs by utilizing a plurality of nodes that can be located across different environments. The application can utilize caching technologies to load and store one or more algorithms 96 and corresponding resultant data. In particular, the web-based application can employ a check-then-write caching strategy in which all data values are first checked in the cache of the application during the retrieval process. The cached algorithm program code is keyed using its location which provides the web-based application with the ability to dynamically update one or more algorithms 96 at their respective locations. Accordingly, a plurality of application nodes can receive the most recent version of a respective algorithm 96 from the cache after the respective algorithm 96 has been updated which improves system performance by reducing disk read and writes. The web-based application will be discussed in further detail below in connection with FIG. 7.

Figure 7:
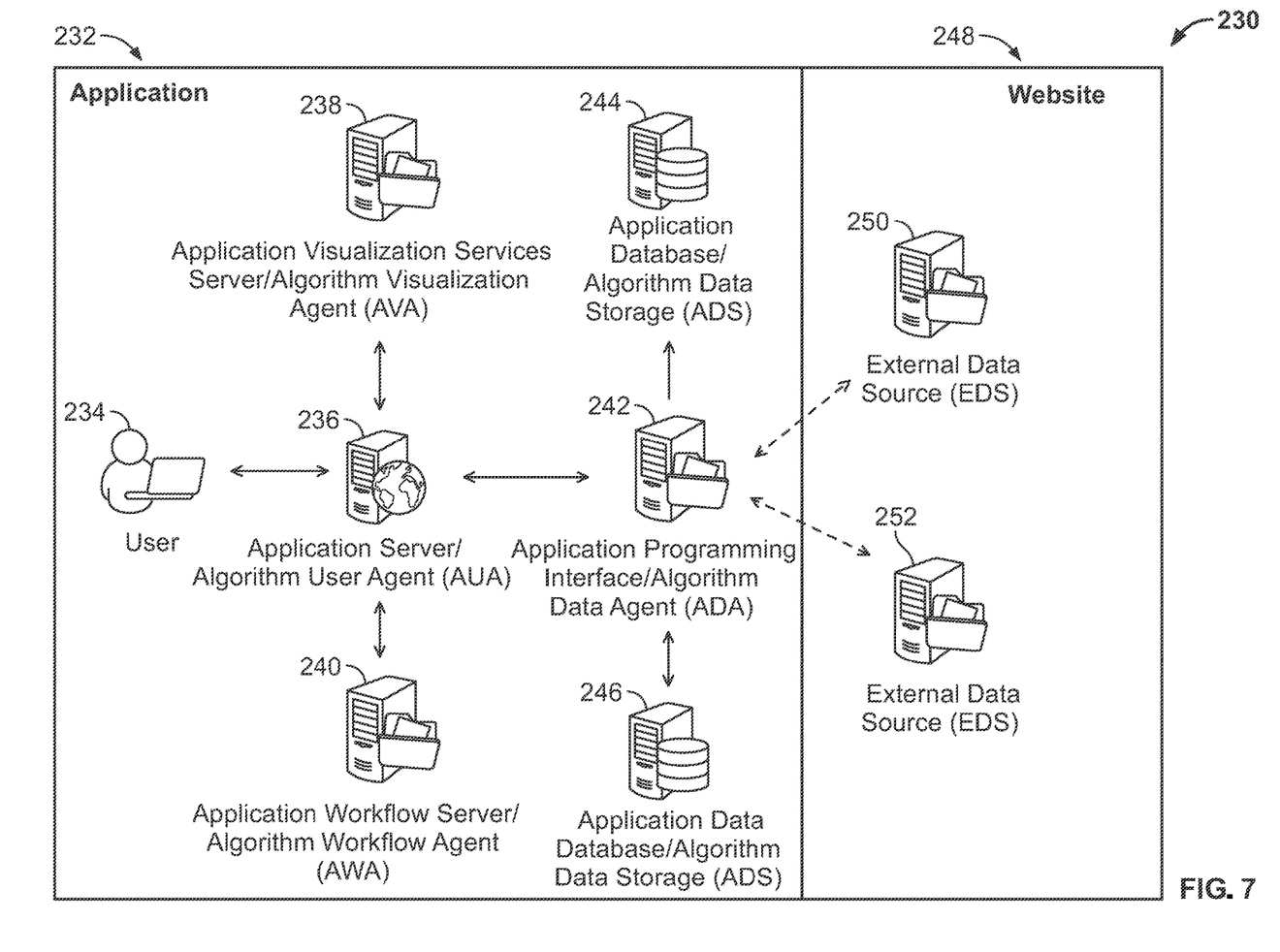
FIG. 7 is a diagram illustrating a system of an embodiment of the present disclosure.
Figure 9:
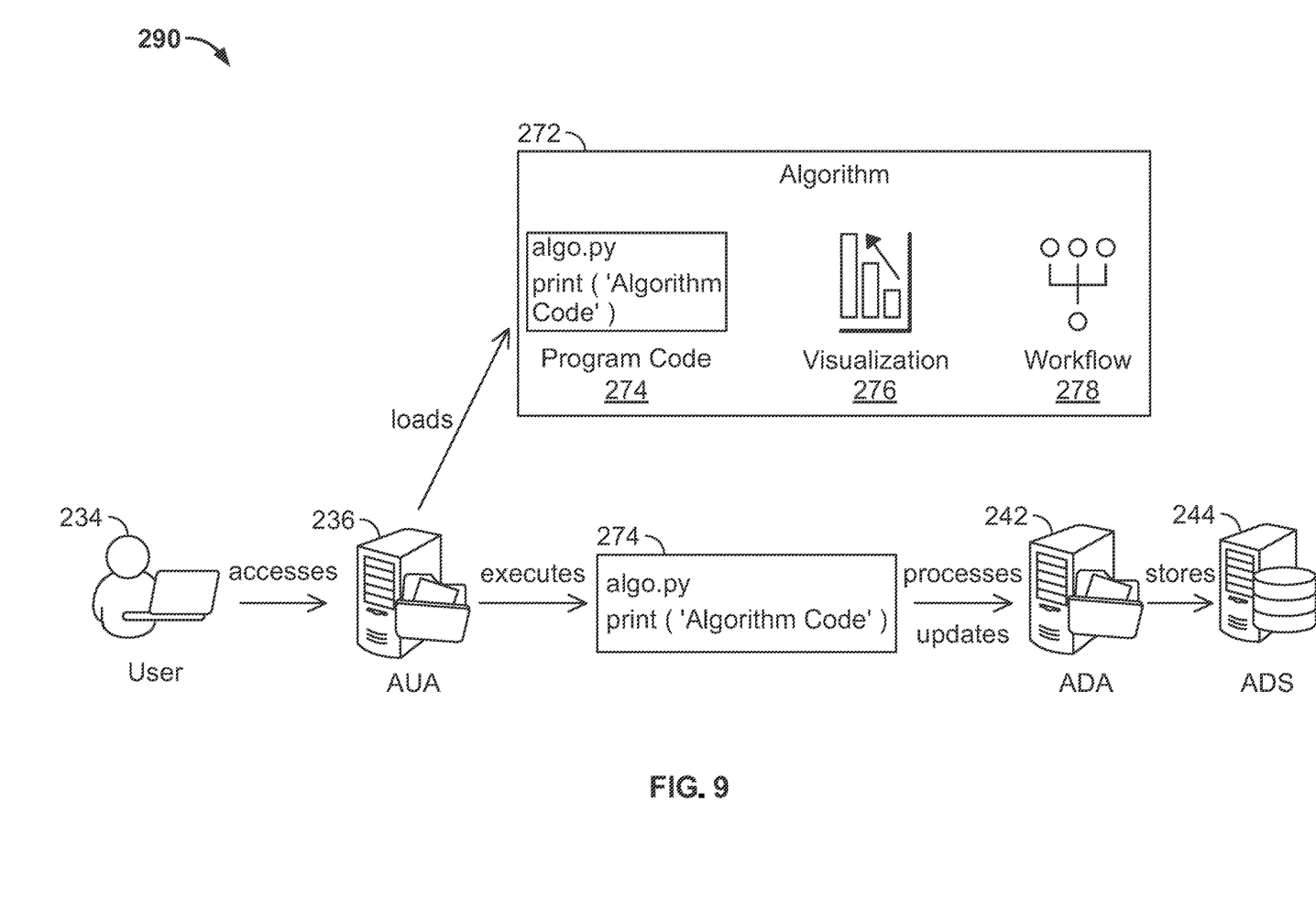
FIG. 9 is flowchart illustrating an execution process of an algorithm executed by the system of FIG. 7.

FIG. 7 is a diagram illustrating a system 230 of an embodiment of the present disclosure. The system 230 includes an application 232 in communication with a website 248. The application 232 communicates with the website 248 to execute an algorithm 272 (as shown in FIG. 9). The application 232 includes a user 234, an application server 236 (i.e., an algorithm user agent (AUA)), an application visualization services server 238 (i.e., an algorithm visualization agent (AVA)), an application workflow server 240 (i.e., an algorithm workflow agent (AWA)), an application programming interface 242 (i.e., an algorithm data agent (ADA)), an application database 244 (i.e., an algorithm data storage (ADS)), and an application data database 246 (i.e., an ADS). The website 248 includes one or more external data sources (EDS) 250a, 250b.

In the system 230, a user 234 can access the AUA 236 via a user account over a network communications connection. The user 234 can invoke a feature in the AUA 236 to select and load the algorithm 272 for execution. The AUA 236 can retrieve the algorithm 272 from a digital storage and load the algorithm program code 274 (as shown in FIG. 9) into its digital execution memory. Software of the AUA 236 executes the program code 274 instructions.

It is noted that the program code 274 can execute one or more updates or modifications to data by utilizing network-based connectivity with the ADA 242. These updates can be stored via a connection between the ADA 242 and one or more nodes of at least one of the ADS 244 and the ADS 246. When a data update is executed in digital storage provided by at least one of the ADS 244 and the ADS 246, the AVA 238 can render the change via a connection between the AVA 238 and the ADA 242. A data change between the algorithm program code 274 and the ADA 242 occurs asynchronously. As such, new renderings of visualizations by the AVA 238 can occur upon a data update in real time.

Figure 8:
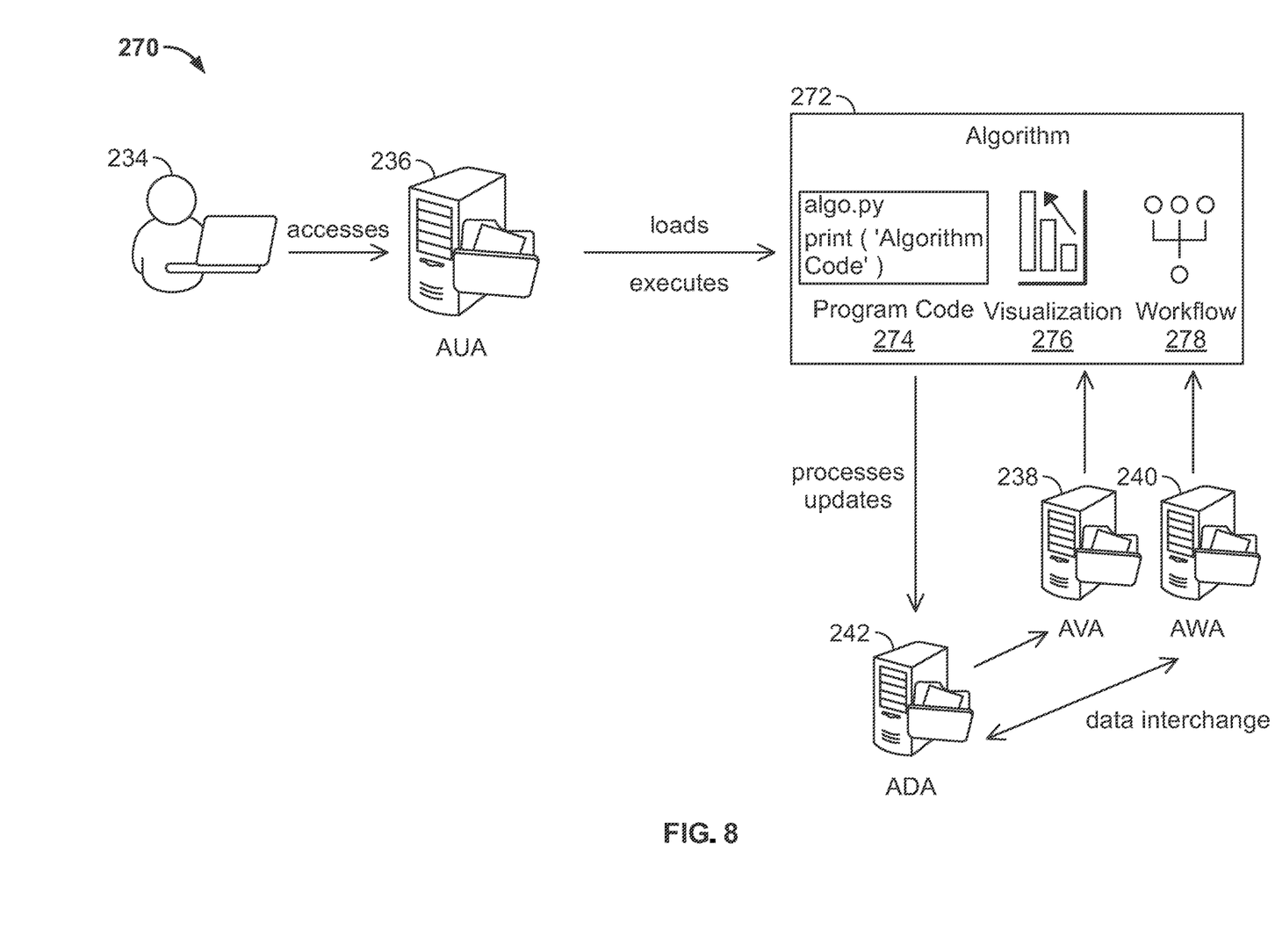
FIG. 8 is a flowchart illustrating a data flow process of an algorithm executed by the system of FIG. 7.

In addition, a data modification by a user 234 can be carried out by an execution of a workflow 278 (as shown in FIG. 8). The data modification can be stored by the AWA 240 via a network-based connection to the ADA 242. It is noted that a change incurred during a workflow process occurs asynchronously. The features of the algorithm 272 and the components of each of the application 232 and the website 248 will be discussed in further detail below.

The algorithm 272 is a digitally stored construct consisting of logical programming code and can be executed on a processor-based digital computer, one or more digitally stored visual programs and instructions to render digitally stored data, and one or more digitally stored routines and programs that contain instructions for a user 234 to follow. The features of the algorithm 272 and the system 230 environment in which the algorithm 272 is executed provides for the automation of risk detection, risk visualization, and risk resolution while improving processing speed and utilizing fewer computational resources as discussed above in relation to FIG. 1.

The component parts of the algorithm 272 are digitally stored. In particular, the algorithm 272 can store its component parts of its construct in entirety, or utilize a pointer object such as a URL, a Uniform Resource Name (URN), a local file or a binary storage object. The algorithm 272 can be utilized to execute the programming code 274 in another algorithm. In addition, the algorithm 272 can link itself to another algorithm to form and execute a linked algorithm. The link between the algorithm 272 and another algorithm may be a pointer object such as a URL, a URN, a local file, or a binary storage object. It is noted that multiple algorithms 272 can be linked to form larger complex algorithms and routines. As discussed above, one or more input parameters may be provided to govern the algorithmic processing of the algorithm 272. The algorithm 272 may obtain one or more input parameters from another algorithm 272, a URL, a URN, a local file or a binary storage object. In addition, the algorithm 272 may provide one or more input parameters to a linked algorithm for execution. FIGS. 8-12 illustrate different algorithm 272 processes including data flow, execution, visualization, workflow and chaining which will be discussed in further detail below.

As shown in FIG. 7, the user 234 is in communication with the AUA 236. The AUA 236 is a user-centric digital service accessible over a network-based communications system which communicates with the user 234 to author, store, and execute one or more algorithms 272. The AUA 236 can be utilized by the user 234 to associate a visual routine or program, an executing program or a routine for user-executed steps with program code. In addition, the AUA 236 can access the algorithm 272 and the component parts thereof by utilizing direct disk access, a data storage service or device, or a digital data service. The AUA 236 can execute security protocols to protect process and algorithmic data. For example, the AUA 236 can utilize a user-based account system to authenticate and authorize a user 234 for access in executing the algorithm 272. In addition, the AUA 236 can utilize encrypted communications for executing the algorithm 272 and publishing the components thereof.

The AUA 236 is in communication with each of the AVA 238, the AWA 240 and the ADA 242. The AVA 238 is a digital data storage service, executing program, or device that is utilized to author, edit, retrieve, and store routines or running programs that are utilized to present and render text based or graphical information related to data manipulated by an executed algorithm. Therefore, the AUA 236 can utilize the AVA 238 to retrieve and render a visualization for display to the user 234.

Similarly, the AWA 240 is also a digital storage service, executing program or device. However, the AWA 240 can be utilized to author, edit, execute, retrieve, and store routines and programs that contain instructions for user-executed directed graph, skip-logic based, or workflow step processing for a user 234 to follow in the course of solving a real world problem. As such, the AUA 236 can utilize the AWA 240 to retrieve and present a workflow to the user 234 and to capture and store data input by the user 234 via the workflow.

The ADA 242 is in unilateral communication with the ADS 244 and bilateral communication with the ADS 246. Each of the ADS 244 and the ADS 246 is a data storage service or device that is utilized for digital storage. The ADA 242 works with each of the ADS 242 and the ADS 244 to store algorithm program code 274, data read by or manipulated by the algorithm 272, and results generated by the algorithm 272. The ADA 242 is also in bilateral communication with each of the EDS 250 and the EDS 252 of the website 248. Each of the EDS 250 and the EDS 252 is a data storage service or device that resides over a network-based communications system that can be utilized for reading, writing or manipulating data by the algorithm 272. It is noted that the algorithm 272 may observe data changes utilizing a network-based connection to the ADA 242.

FIGS. 8-12 illustrate different processes of the algorithm 272 including data flow, execution, visualization, workflow and chaining. FIG. 8 is a flowchart illustrating a data flow process 270 of the algorithm 272 executed by the system 230 of FIG. 7. As shown in FIG. 8, the user 234 accesses the AUA 236 and the AUA 236 loads and executes the algorithm 272. The algorithm 272 includes program code 274, a visualization 276 and a workflow 278. The algorithm 272 utilizes the ADA 242 to update and process the program code 274 to modify the visualization 276. The AVA 238 receives the update from the ADA 242 and renders the modification to the visualization 276. Additionally, the ADA 242 and the AWA 240 perform a data interchange to display the workflow 278. Importantly, the chainable algorithm 272 includes ("containerizes") the program code 274 (which could include code for executing a data modeling and/or analytical function), the visualization code 276 (which automatically instructs one or more computer systems on how to visualize the results (or, output) of the program code 274), and the workflow 278 (which instructs another chainable algorithm 272 or subject matter expert on subsequent actions that may be required relating to the data being modeled or analyzed), in a single algorithm that can be easily managed, transferred, and executed by a plurality of disparate computer systems. Thus, as can be appreciated, the program code 274, the visualization code 276 (which is specifically written to render output of the program code 274), and the workflow code 278 are "embedded" in a single algorithm that can be chained with (and inter-communicate with) other algorithms in accordance with the present disclosure as desired.

FIG. 9 is flowchart illustrating an execution process 290 of the algorithm 272 executed by the system 230 of FIG. 7. As shown in FIG. 9, the user 234 accesses the AUA 236 and the AUA 236 loads the algorithm 272 and executes the program code 274 thereof. The program code 274 processes data from the ADA 242. The resultant data is stored in the ADS 244 via the ADA 242.

Figure 10:
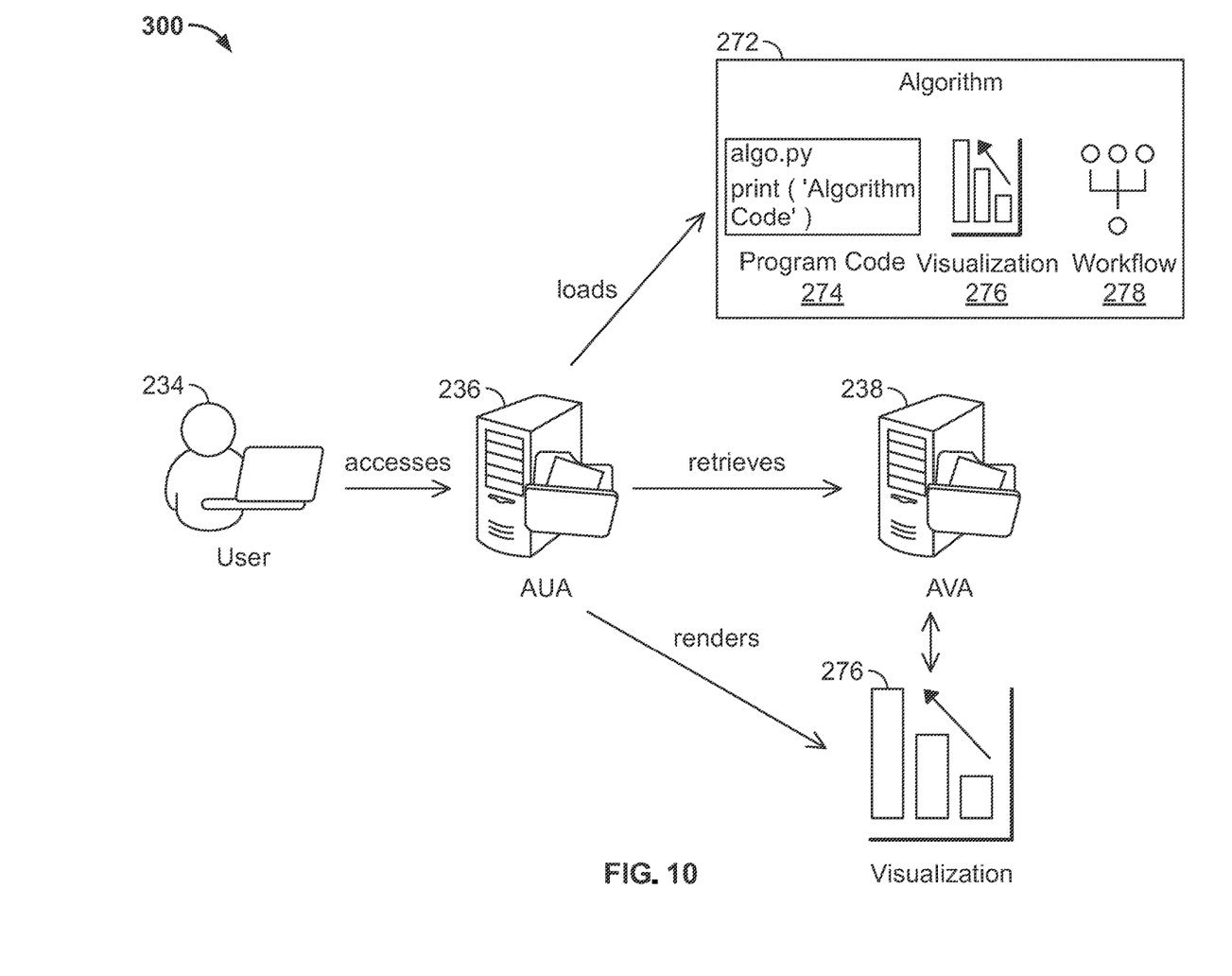
FIG. 10 is a flowchart illustrating a visualization process of an algorithm executed by the system of FIG. 7.
Figure 11:
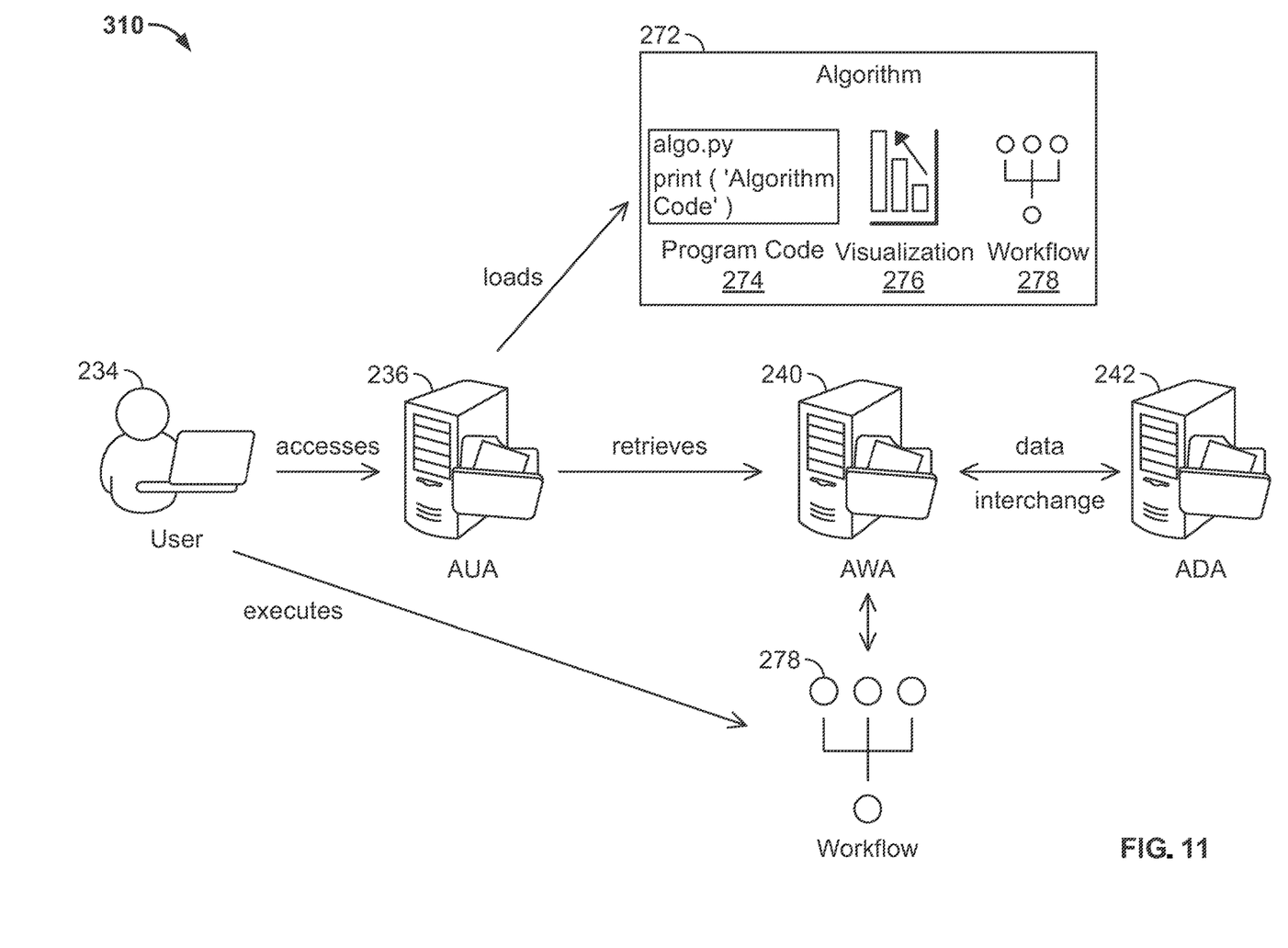
FIG. 11 is a flowchart illustrating a workflow process of an algorithm executed by the system of FIG. 7.

FIG. 10 is a flowchart illustrating a visualization process 300 of the algorithm 272 executed by the system 230 of FIG. 7. As shown in FIG. 10, the user 234 access the AUA 236 and the AUA 236 loads the algorithm 272. The AUA 236 retrieves the visualization 276 via the AVA 238 and subsequently renders the visualization 276 for display to the user 234. FIG. 11 is a flowchart illustrating a workflow process 310 of the algorithm 272 executed by the system 230 of FIG. 7. As shown in FIG. 11, the user 234 accesses the AUA 236 and the AUA 236 loads the algorithm 272. The AUA 236 retrieves the workflow 278 via the AWA 240 and the AUA 236 subsequently presents the workflow 278 to the user 234. The user 234 then executes workflow steps and the execution of the workflow is stored by the AWA 240 via the network-based data interchange connection to the ADA 242. It is noted that a change incurred during a workflow process occurs asynchronously.

Figure 12:
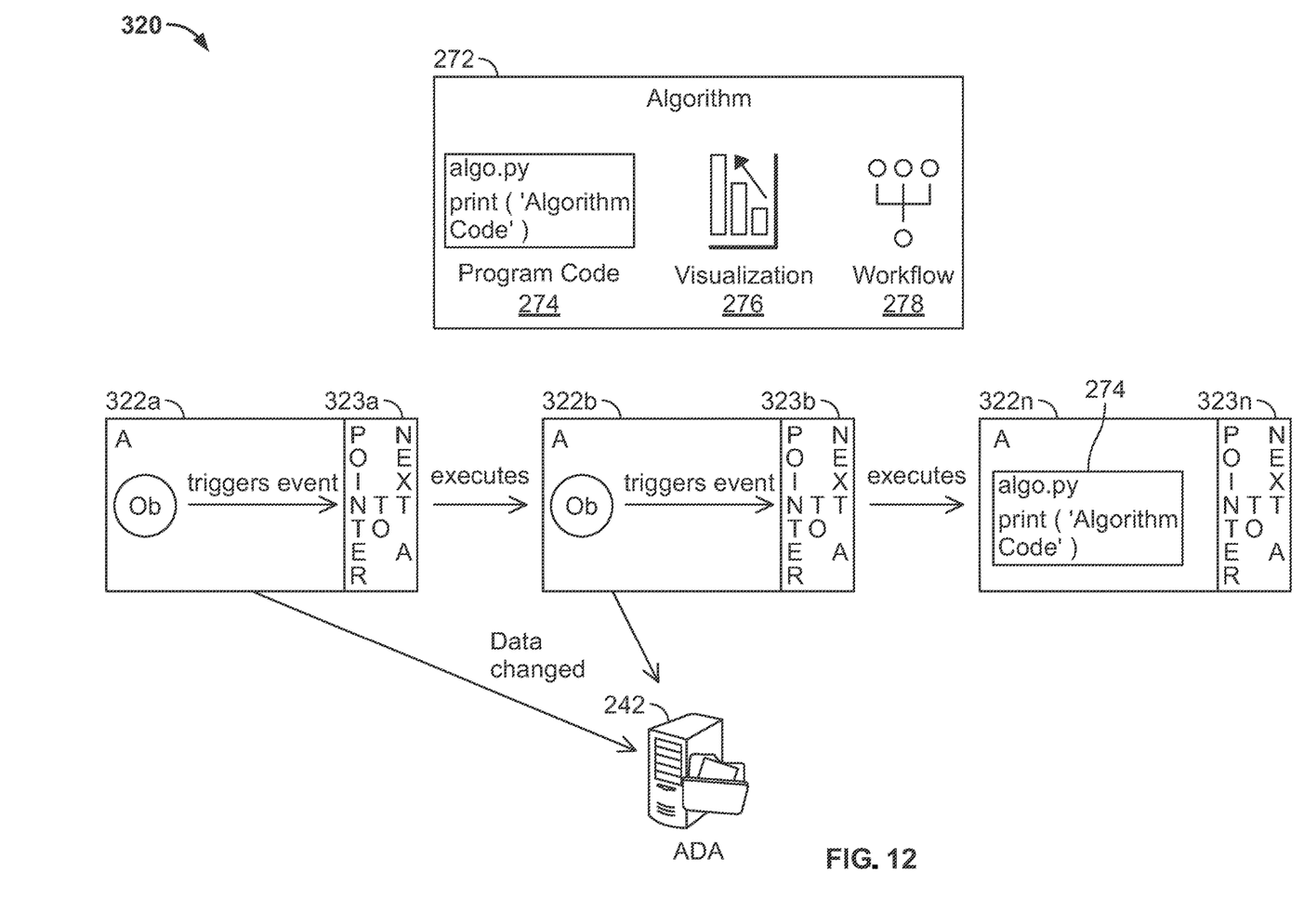
FIG. 12 is a flowchart illustrating a chaining process of an algorithm executed by the system of FIG. 7.

FIG. 12 is a flowchart illustrating a chaining process 320 of an algorithm 272 executed by the system 230 of FIG. 7. As shown in FIG. 12, a plurality of algorithms 322a, 322b and 322*n* are linked by a plurality of pointers 323*a*, 323*b* and 323*n* to form a larger and complex algorithm. The algorithm 272 observes the data of each of the algorithms 322*a* and 322*b* for change. If the algorithm 272 observes a change in the data of one of the algorithms 322*a* and 322*b*, the observed data change triggers an event. A data change can be executed by utilizing the ADA 242. As shown in FIG. 12, the triggered event comprises executing the program code 274 of the algorithm 272 by the algorithm 322*n*. It is further noted that the systems/methods of the present disclosure could include a "survey" tool which supports chaining the algorithms disclosed herein rapidly and efficiently. Indeed, using such a tool, the user can very easily chain together a customized configuration of modular, chainable algorithms in accordance with the present disclosure, in order to efficiently and effectively conduct data modeling and analytics functions of varying complexity, as needed.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

What is claimed is:

1. A system for risk detection, visualization, and resolution using modular chainable algorithms, comprising:
    a computer system having a processor and a memory; and
    at least one modular chainable algorithm stored on the memory and executable by the processor, the first modular chainable algorithm including:
        program code embedded within the modular chainable algorithm for performing a data modeling or analytic function on source data, wherein a first agent permits access to, modification of, and execution of the program code;
        visualization code embedded within the modular chainable algorithm for visualizing output of the program code, wherein a second agent in communication with the first agent executes the visualization code and renders a visualization based on output of the program code;
        workflow code embedded within the modular chainable algorithm for instructing the computer system to automatically perform an action related to the data modeling or analytic function performed by the program code, wherein a third agent in communication with first agent executes the workflow code, and
    wherein a fourth agent in communication with the second agent and the third agent processes updates to the at least one modular chainable algorithm and communicates the updates to the second agent and the third agent to dynamically update visualizations and workflows in response to the updates to the at least at least one modular chainable algorithm.

2. The system of claim 1, wherein the workflow code instructs a subject matter expert to undertake an action relating to the data modeling or analytic function performed by the program code.

3. The system of claim 1, further comprising a second modular chainable algorithm executable by the processor and in communication with the at least one modular chainable algorithm.

4. The system of claim 3, wherein the second modular chainable algorithm includes second program code embedded within the second modular chainable algorithm and executable by the processor for performing a data modeling or analytic function on source data.

5. The system of claim 4, wherein the second modular chainable algorithm include second visualization code embedded within the second modular chainable algorithm and executable by the processor for visualizing output of the second program code.

6. The system of claim 5, wherein the second modular chainable algorithm includes second workflow code embedded within the second modular chainable algorithm and executable by the processor for instructing the computer system to automatically perform an action related to the data modeling or analytic function performed by the second program code.

7. The system of claim 6, wherein the modular chainable algorithm is accessed by a user via an algorithm user agent computer system.

8. The system of claim 7, wherein the program code is executed by an algorithm data agent computer system.

9. The system of claim 8, wherein the algorithm data agent computer system communicates with an algorithm visualization agent computer system, the algorithm visualization agent computer system updating and/or executing the visualization code of the modular chainable algorithm.

10. The system of claim 8, wherein the algorithm data agent computer system communicates with an algorithm workflow agent computer system, the algorithm workflow agent computer system updating and/or executing the workflow code of the modular chainable algorithm.

11. The system of claim 8, wherein output of the program code executed by the algorithm data agent computer system is stored in an algorithm data storage computer system.

12. The system of claim 3, wherein the at least one modular chainable algorithm includes a pointer to the second modular chainable algorithm.

13. A method for risk detection, visualization, and resolution using modular chainable algorithms, comprising the steps of:
    providing a computer system having a processor and a memory, and at least one modular chainable algorithm stored on the memory and executable by the processor;
    executing program code embedded within the modular chainable algorithm to perform a data modeling or analytic function on source data, wherein a first agent permits access to, modification of, and execution of the program code;
    executing visualization code embedded within the modular chainable algorithm to visualize output of the program code; , wherein a second agent in communication with the first agent executes the visualization code and renders a visualization based on output of the program code;
    executing workflow code embedded within the modular chainable algorithm to automatically perform an action related to the data modeling or analytic function performed by the program code, wherein a third agent in communication with first agent executes the workflow code, and
    wherein a fourth agent in communication with the second agent and the third agent processes updates to the at least one modular chainable algorithm and communicates the updates to the second agent and the third agent to dynamically update visualizations and workflows in response to the updates to the at least at least one modular chainable algorithm.

14. The method of claim 13, further comprising instructing a subject matter expert to undertake an action relating to the data modeling or analytic function performed by the program code.

15. The method of claim 13, further comprising providing a second modular chainable algorithm executable by the processor and in communication with the at least one modular chainable algorithm.

16. The method of claim 15, further comprising executing second program code embedded within the second modular chainable algorithm to perform a data modeling or analytic function on source data.

17. The method of claim 16, further comprising executing second visualization code embedded within the second modular chainable algorithm to visualize output of the second program code.

18. The method of claim 17, further comprising executing second workflow code embedded within the second modular chainable algorithm to automatically perform an action related to the data modeling or analytic function performed by the second program code.

19. The method of claim 13, further comprising executing the program code using an algorithm data agent computer system.

20. The method of claim 19, further comprising accessing the at least one modular chainable algorithm using an algorithm user agent computer system.

21. The method of claim 19, further comprising updating and/or executing the visualization code of the modular chainable algorithm using an algorithm visualization agent computer system in communication with the algorithm data agent computer system.

22. The method of claim 19, further comprising updating and/or executing the workflow code of the modular chainable algorithm using an algorithm workflow agent computer system in communication with the algorithm data agent computer system.

23. The method of claim 19, further comprising storing output of the program code executed by the algorithm data agent computer system in an algorithm data storage computer system.

* * * * *